United States Patent [19]
West et al.

[11] Patent Number: 5,477,752
[45] Date of Patent: Dec. 26, 1995

[54] VALVE ACTUATOR DECLUTCH MECHANISM

[75] Inventors: Thomas C. West, Muskegon; Michael P. Davison, Grand Haven; Kurt J. Kastelic, Muskegon, all of Mich.

[73] Assignee: Dyna-Torque Company, Inc., Muskegon, Mich.

[21] Appl. No.: 206,636

[22] Filed: Mar. 7, 1994

[51] Int. Cl.[6] .................................................. F16K 31/05
[52] U.S. Cl. ................................ 74/625; 74/425; 74/526; 251/129.03
[58] Field of Search ............................. 74/396, 405, 425, 74/526, 625; 251/14, 129.03, 291; 192/3.63, 20

[56] References Cited

U.S. PATENT DOCUMENTS

| | | | |
|---|---|---|---|
| 1,072,282 | 9/1913 | Waninger | 74/405 |
| 2,391,418 | 12/1945 | Hodgson et al. | 74/625 |
| 2,878,687 | 3/1959 | Kron et al. | 74/625 |
| 4,130,030 | 12/1978 | Stratienko | 74/625 |
| 4,429,592 | 2/1984 | Stevenson | 74/625 |
| 4,616,803 | 10/1986 | Schils | 251/14 X |

FOREIGN PATENT DOCUMENTS

| | | | |
|---|---|---|---|
| 8303126 | 9/1983 | WIPO | 74/425 |

OTHER PUBLICATIONS

El–O–Matic Bulletin No. M0184, dated prior to Feb. 16, 1993.

The Mastergear Corporation ad, dated prior to Feb. 16, 1993.

*Primary Examiner*—Rodney H. Bonck
*Assistant Examiner*—Troy Grabow
*Attorney, Agent, or Firm*—Warner Norcross & Judd

[57] ABSTRACT

An improved declutch mechanism for a manual override for a valve. The declutch mechanism includes a U-shaped declutch layer that is fit with a spring-biased locking bar. The locking bar is biased to engage the housing of the override mechanism to prevent accidental or inadvertent operation of the declutch lever. A single hand may be used to disengage the locking bar from the housing to allow operation of the declutch lever. The declutch mechanism also includes a safety mechanism to prevent the override mechanism from being disengaged when its actuator shaft is not in the default position. The safety mechanism includes a plunger that is movable between a first position in which the plunger prevents the locking bar from being disengaged with the housing, and a second position in which the plunger is received within a keyway in the actuator shaft to allow the locking bar to be disengaged from the housing.

28 Claims, 4 Drawing Sheets

VALVE ACTUATOR DECLUTCH MECHANISM

The present invention relates to a manual override for a valve actuator, and more particularly to a declutch mechanism for such an override.

A variety of automated valve actuators has been developed to provide automated control of the flow rate of a valve. These devices typically are either pneumatic and hydraulic rotary actuators. The actuators are mounted directly to the valve housing and engage the control shaft Of the valve to provide rotational movement thereof. However, power failure or actuator malfunction may prevent the intended automated control of the valve. In such situations, it is desirable to have a manual override.

Manual override mechanisms are well know in the industry and permit manual operation of the valve. Manual overrides may be positioned between the valve and the automated actuator and include an override shaft interposed between the control shaft of the valve and the actuator shaft of the automated actuator. A drive gear is mounted on the override shaft to permit mechanical rotation of the shaft. A worm gear engages the drive gear. The worm gear is mounted on an axle that extends from the casing of the override and includes a handwheel. Rotation of the handwheel is translated into rotational movement of the valve shaft.

The override also includes a declutch mechanism for disengaging the worm gear from the drive gear during automated operation. While the drive gear can be operated by rotation of the worm gear, the reverse is not true. Consequently, the two elements must be disengaged from one another before the automated actuator is able to rotate the control shaft of the valve. The declutch mechanism also prevents unintentional or inadvertent manual operation when the valve is under automated control. The declutch mechanism generally includes a pair of bushings that are rotatably seated in the body of the override. The bushings each include an eccentric throughbore for receiving the axle on which the worm gear is mounted. As the bushings are rotated, the eccentric seating of the axle causes the worm gear to engage and disengage the drive gear of the override mechanism. In addition, the declutch mechanism can include a declutch lever secured to the bushings to facilitate their rotation.

Current declutch levers extend beyond at least one of the ends of the declutch mechanism during the normal range of movement. This prevents operation of the declutch mechanism when the body of either the valve or the automated actuator extends into the path of the declutch lever. As a result, the declutch mechanism may dictate the mounting alignment of the valve and actuator and may even be incompatible with certain combinations.

Further, declutch levers are often provided with a locking means for preventing accidental or inadvertent operation of the declutch mechanism. One type of locking mechanism includes a plunger that extends through the casing of the override to selectively engage either one of the bushings or the declutch lever. Such plungers require two hands to perform the declutching operation—one to hold the plunger and a second to operate the declutch lever. In addition, the plunger assemblies are relatively expensive, and their fabrication and assembly into the override are labor intensive.

In addition, many automated actuators include a default mechanism for returning the valve shaft to a default position in response to a power failure or ocher system malfunction. The default mechanism generally includes a spring that is compressed by movement away from the default position. When the power fails or the system malfunctions, the compressed spring returns the shaft of the valve to the desired position. Present overrides permit declutching when the spring is Compressed. Unfortunately, serious damage to the automated actuator, and possibly the operator, may result in such cases.

SUMMARY OF THE INVENTION

The aforementioned problems are overcome by the present invention wherein a declutch mechanism includes a locking declutch lever that is operable with a single hand and does not extend beyond either mounting surface of the mechanism. In addition, the present invention includes a safety device that prevents declutching when the automated actuator is not in the default position.

The present invention generally includes a declutch lever secured to a pair of bushings eccentrically seating a manual drive axle. The declutch lever is generally U-shaped and includes a locking bar to prevent accidental or inadvertent operation of the declutch lever. The locking bar is spring-biased toward the casing of the override mechanism. When the locking bar engages the casing, the declutch lever is inoperable. The lever becomes operable by simply pulling the locking bar away from the casing.

The declutch mechanism further includes a safety mechanism for preventing disengagement of the manual drive axle when the automated actuator is not in the default position. The safety mechanism includes a safety plunger moveable between a first position, in which the plunger prevents movement of the locking bar away from the casing, and a second position, in which the plunger engages a keyway in the actuator shaft of the override mechanism to allow movement of the locking bar away from the casing. The safety plunger is moveable to the second position only when the actuator shaft is in the default position.

The present invention provides a simple and effective locking declutch lever that does not extend beyond either end of the override body and is easily unlocked and operated with a-single hand. In addition, the present invention provides a dependable safety device for protecting the operator and the automated actuator by preventing disengagement of the manual drive axle when the actuator is not in the default position.

These and other objects, advantages, and features of the present invention will be more fully understood and appreciated by reference to the detailed description of the preferred embodiment and the drawings.

DETAILED DESCRIPTION OF THE PREFERRED EMBODIMENT

Figure 1:
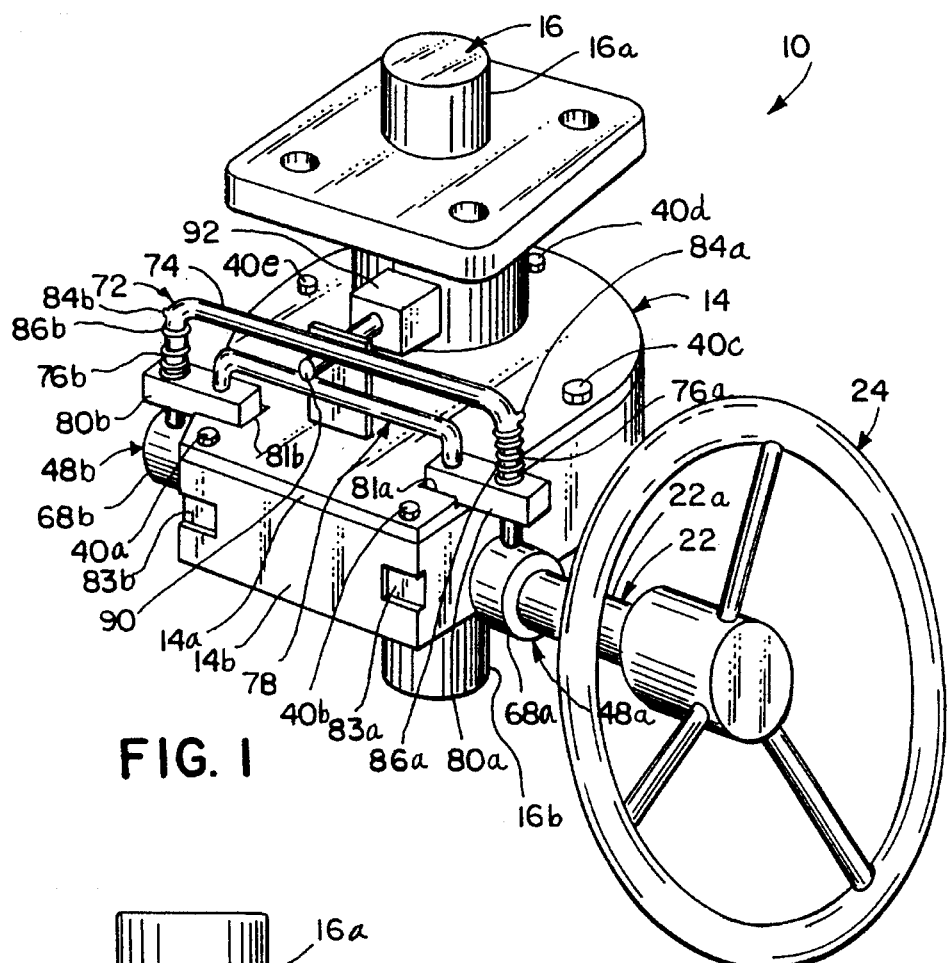
FIG. 1 is a perspective view of the override mechanism of the present invention.
Figure 6:
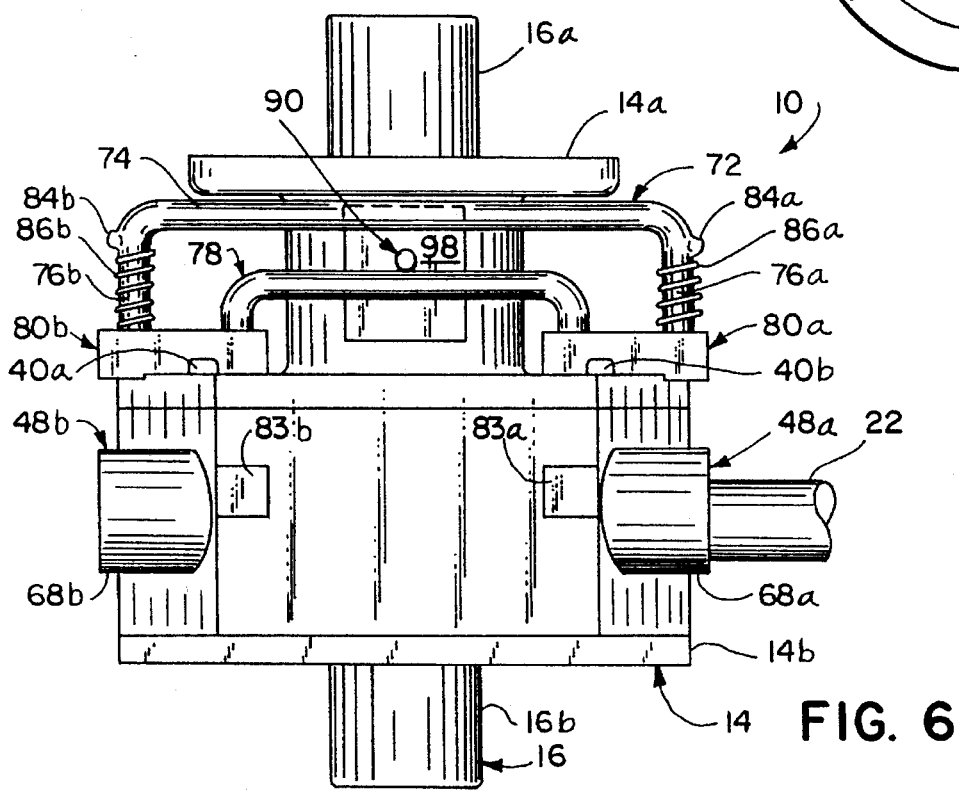
FIG. 6 is a front elevational view of the override mechanism.

A manual override mechanism incorporating the improved declutch mechanism of the present invention is illustrated in FIG. 1 and generally designated 10. The override mechanism 10 generally includes a housing 14, an actuator shaft 16, a drive gear 18, a worm gear 20, a handwheel 24, and a declutch mechanism 70.

The housing 14 is generally comprised of cast upper 14a and lower 14b halves. Other fabrication methods may be used. The two halves 14a and 14b are secured to one another by a plurality of bolts 40a–e that extend through holes 42a–e in the upper halve 14a and engage threaded bores 44a–e in the lower halve 14b. The upper and lower surfaces of the housing provide mounting surfaces, or ends, by which the override mechanism 10 is mounted between a valve and an automated actuator. Thee lower half 14b of the housing 14 includes a pair of circular openings 46a and 46b that are defined along an axis parallel to the mating surfaces of the two halves. In addition, both halves 14a–b of the housing include a circular opening 41a and 41b. The circular openings 41a and 41b are in axial alignment and receive actuator shaft 16.

The actuator shaft 16 is seated for rotational movement within the housing 14. Opposite longitudinal ends of the shaft 16a and 16b extend from the housing 14. A keyway 26 is defined in a central portion of the shaft 16 to allow a drive gear 18 to be secured thereto. The drive gear 18 is concentrically mounted to the actuator shaft 16 and is rotatably received within the housing 14. The drive gear 18 includes a keyway 28 and is secured to the shaft 16 by means of a key 30 received within keyways 26 and 28. The disclosed override mechanism 10 is designed to operate a quarter-turn valve (e.g. a ball valve) wherein the valve shaft has a 90 degree range of rotation. In such a design, the drive gear 18 is preferably a quadrant gear. However, the present invention is not limited in application to quarter-turn devices; and a variety of types of drive gears may be employed to provide the desired range of rotation.

As noted above, the lower half 14b of the housing includes a pair of axially aligned openings 46a and 46b. A pair of bushings 48a–b each having an eccentric throughbore 50a–b are seated for rotation within openings 46a and 46b. The bushings 48a and 48b each include an extended end portion 68a and 68b, respectively, that extends out of the housing 14. A manual drive axle 22 is rotatably received in bores 50a and 50b. The axle 22 has opposite longitudinal ends 22a and 22b. The first longitudinal end 22a terminates within bushing 48a, and the second longitudinal end extends from the housing 14 through bushing 48b. A conventional handwheel 24 is secured to the end 22a. The eccentric seating of the drive axle 22 within bushings 48a and 48b causes the drive axle 22 to move toward and away from the drive gear 18 when the bushings 48a and 48b are rotated (See FIGS. 3 and 4).

A worm gear 20 is concentrically mounted on and secured to the manual drive axle 22 within housing 14. The worm gear 20 and axle 22 each include a keyway 52a and 52b, respectively. A key 54 is seated within keyways 52a and 52b to secure the worm gear 20 to the axle 22. The threads 56 of the worm gear engage the teeth 58 of the drive gear 18 when the bushings 48a and 48b are disposed in the appropriate angular position.

The override mechanism 10 further includes a declutch lever 72, which is generally U-shaped and includes a cross member 74 extending between a pair of legs 76a and 76b. The free end of each leg 76a and 76b is affixed to one of the extended end portions 68a and 68b of bushing 48a and 48b, thereby facilitating rotational movement of the bushings 48a and 48b through angular movement of the lever. The legs 76a and 76b are short enough to prevent the lever 72 from extending beyond the planes defined by the upper and lower mounting surfaces or ends of the override mechanism. The lever 72 is moveable between an engaged position in which the worm gear 20 engages the drive gear 18, and a disengaged position in which the worm gear 20 does not engage the drive gear 18.

To prevent accidental or inadvertent movement of the declutch lever 72, a spring-biased locking bar 78 is mounted between the legs 76a–b of the lever. The locking bar 78 generally includes a pair of blocks 80a and 80b—each of which is slidably received on one of legs 76a and 76b. A handle 82 extends between the pair of blocks 80a–b to facilitate their longitudinal movement along legs 76a and 76b. A dimple 84a–b is formed on each leg 76a–b adjacent the intersection of the leg 76a–b with the cross member 74. A spring 86a–b fits over each leg 76a–b and between the dimple 84a–b and the block 80a–b. The springs 86a–b cause the blocks 80a and 80b of the locking bar 78 to engage slots 81a–b or slots 83a–b to prevent the angular movement of the declutch lever 72. Alternatively, the handle 82 may extend through the bottom of blocks 80a and 80b, and slots 81a–b and 83a–b may be replaced by holes drilled in the housing (not shown). In this alternative arrangement, the extended portions of the handle 82 fit within the drilled holes to secure the declutch lever 72. In either arrangement, the locking bar 78 may be pulled upward along legs 76a–b toward cross member 74 to disengage the slots 81a–b and 83a–b or holes and allow angular movement of the lever 72.

Figure 2:
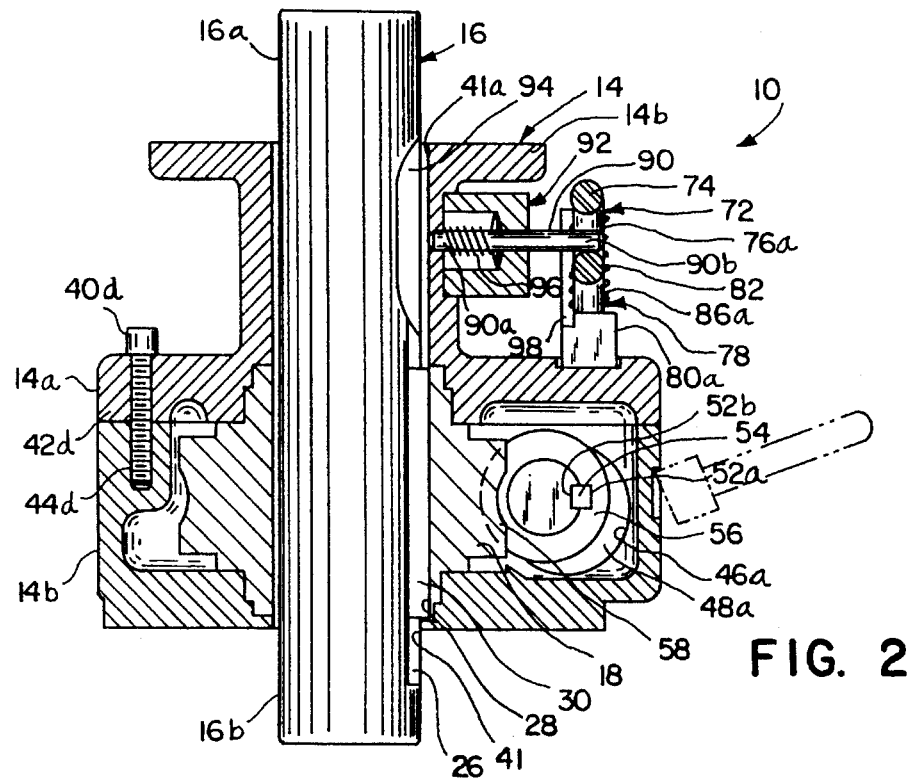
FIG. 2 is an elevational view of the override mechanism, partially cut away, showing the declutch mechanism in the engaged position.
Figure 3:
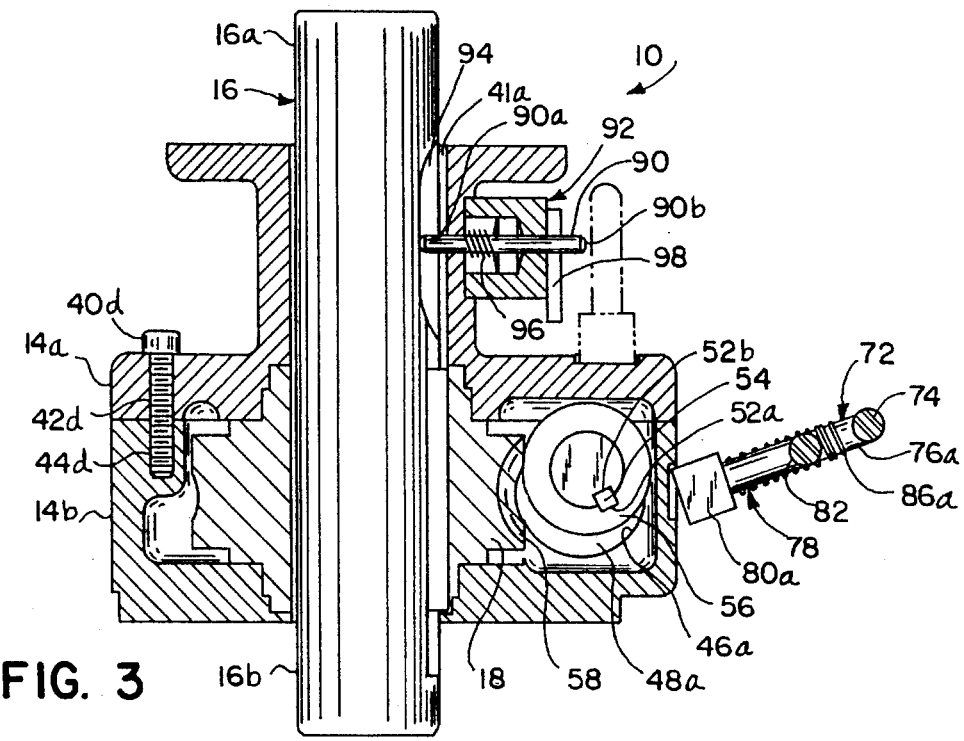
FIG. 3 is an elevational view of the override mechanism, partially cut away, showing the declutch mechanism in the disengaged position.
Figure 4:
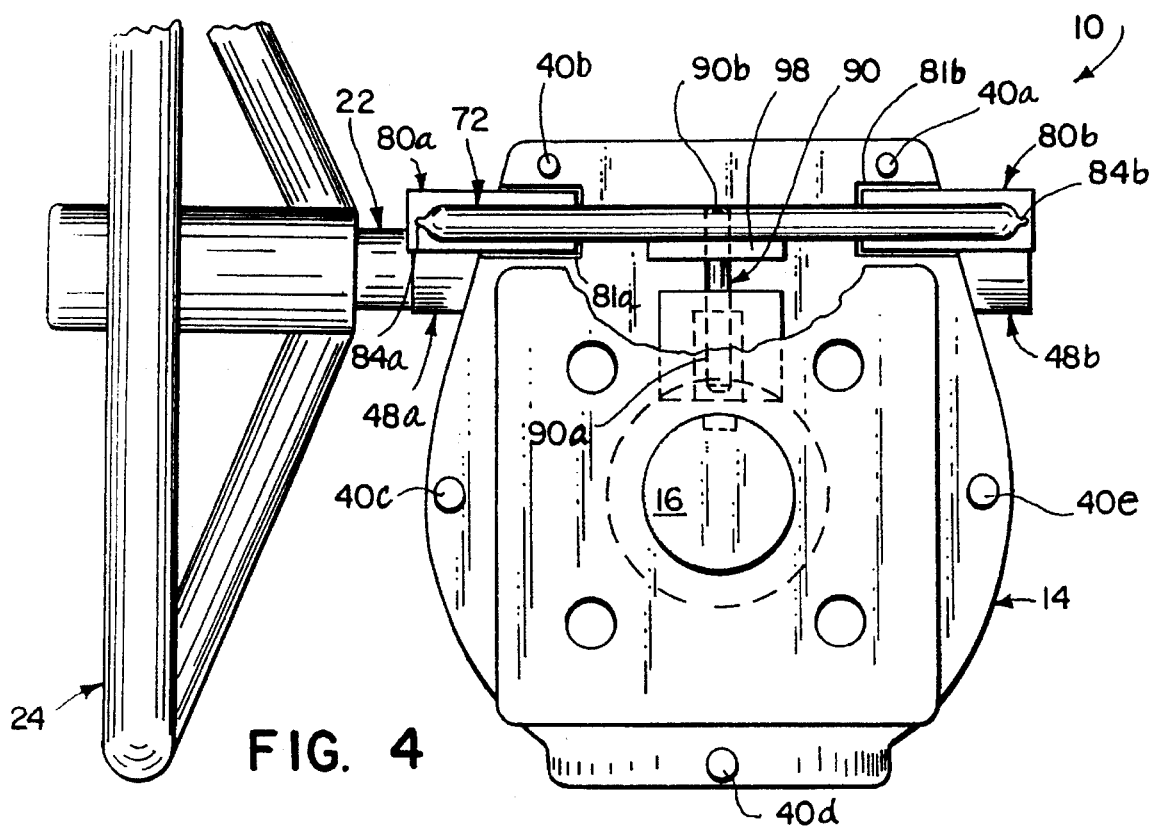
FIG. 4 is a top plan view of the override mechanism showing the safety mechanism in the locked position.
Figure 5:
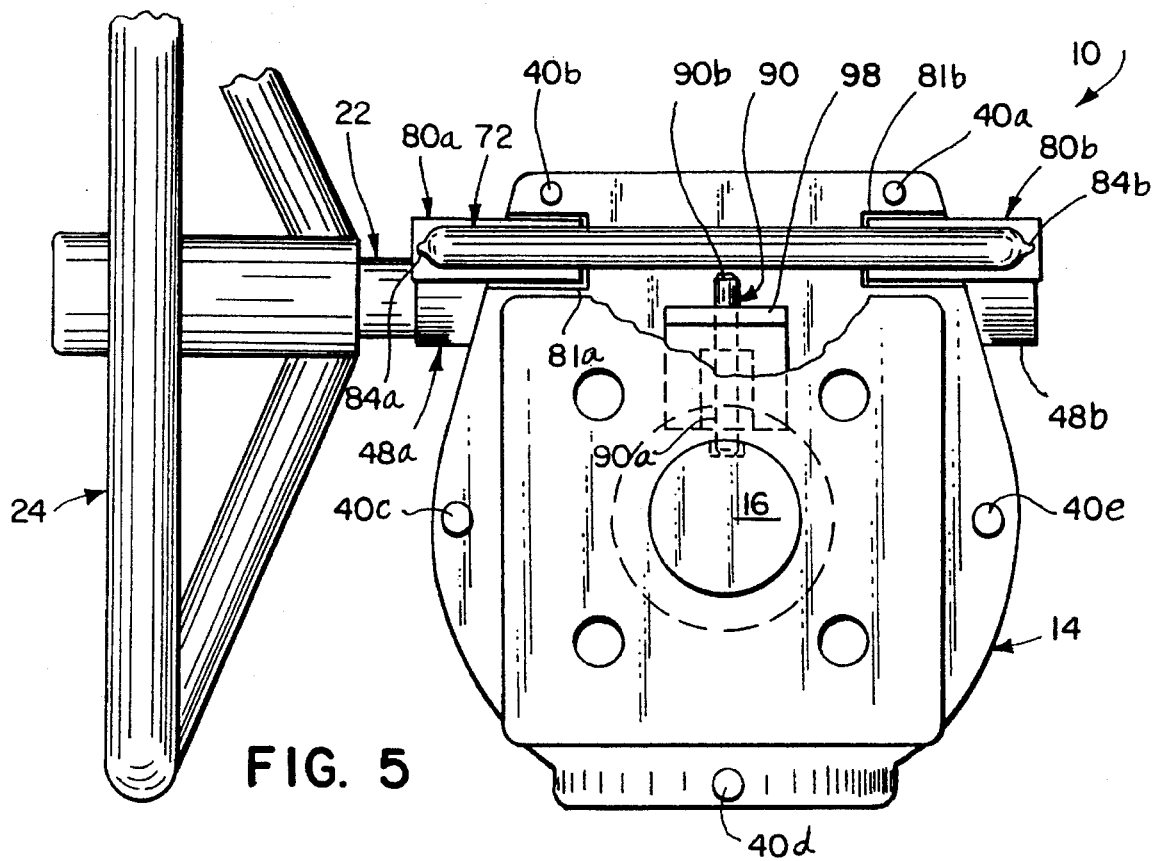
FIG. 5 is a top plan view of the override mechanism showing the safety mechanism in the unlocked position.

As perhaps best illustrated in FIGS. 2 and 3, when the lever 72 is in the engaged position, the bushings 48a and 48b are rotated such that the axle 22 is moved toward the drive gear 18. As the axle 22 is moved toward the drive gear 18, the threads 56 of the worm gear mesh with the teeth of the drive gear 18 to allow rotational movement of the handwheel 24 to be translated into rotational movement of the actuator shaft 16.

Referring now to FIG. 3, when the lever 72 is in the disengaged position, the bushings 48a and 48b are rotated such that the axle 22 is moved away from the drive gear 18. This causes the threads of the worm gear 20 to disengage from the teeth of the drive gear 18. Consequently, the handwheel 24 and actuator shaft 16 rotate free of one another.

The manual override mechanism 10 further includes a safety mechanism for preventing the worm gear 20 from disengaging the drive gear 18 when the actuator shaft 16 is not in the default position. The safety mechanism generally includes a plunger 90 having a first end 90a that extends into the housing 14 through collar 92, and a second end 90b that extends out of the housing through collar 92. The plunger 90 is shiftable in the axial position to selectively prevent the declutch lever 72 from being moved into the disengaged position. A spring 96 is affixed to the plunger 90 and seated against the housing 14 within collar 92. The spring biases the plunger 90 in a position to prevent movement of the declutch lever 72. A flange 98 is secured to the second end 90b of the plunger 90 to facilitate movement of the plunger 90 into a position that allows movement of the declutch lever 72.

The plunger 90 is moveable between a first axial position in which the first end 90a engages a keyway 94 defined in the actuator shaft 16, and a second axial position in which the second end 90b intersects the plane defined by the legs 76a–b and cross member 74 of the declutch lever 72 when it is in the engaged position. In the second position, the second end 90b of the plunger 90 extends above the locking bar 78 to prevent it from being lifted towards cross member 74. As a result, the declutch lever 72 is secured in the engaged position. In the first position, the second end 90b of the plunger 90 is moved toward the actuator shaft 16 so that it no longer extends above the locking bar 78. Consequently, the locking bar 78 may be lifted toward the cross member 74 to allow angular movement of the declutch lever 72.

The plunger 90 can only be moved into the first position when aligned with keyway 94. If not aligned with keyway 94, first end 90a abuts with actuator shaft 16 to prevent axial movement of the plunger 90. The keyway 94 is positioned to align with the plunger 90 only when the actuator shaft 16 is in the default position. Accordingly, the declutch lever 72 cannot be disengaged when the actuator shaft 16 is not in the default position.

Operation

Figure 7:
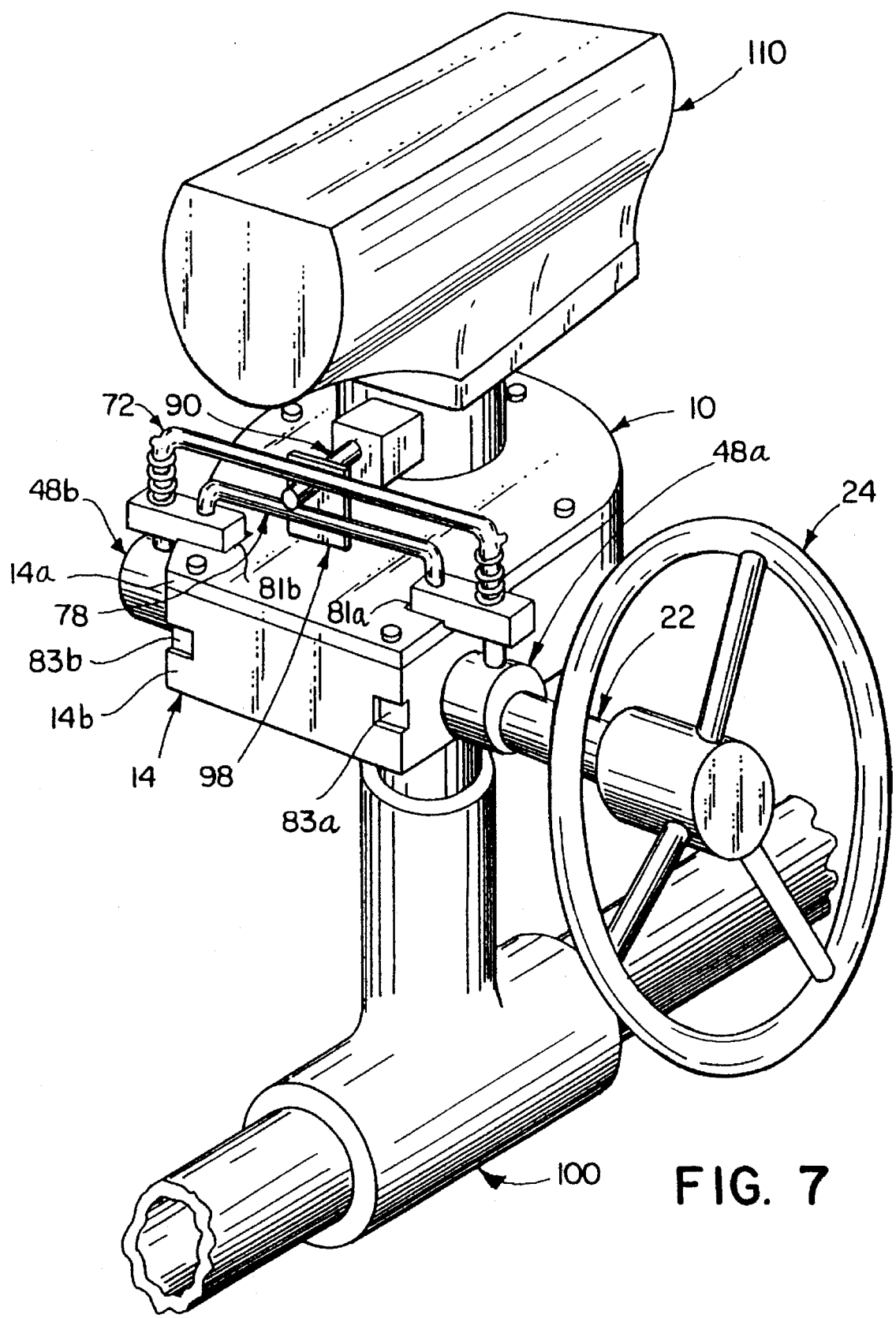
FIG. 7 is a perspective view showing the override mechanism installed between a valve and an automated actuator.

In operation, the override mechanism 10 is mounted between a valve 100 and a pneumatic valve actuator 110 (See FIG. 7). The first end 16a of the actuator shaft 16 engages the drive shaft (not shown) of the automated actuator 110, and second end 16b of the actuator shaft 16 engages the valve shaft (not shown) of the valve 100. Any rotational movement of the drive shaft of the automated actuator 110 is imparted directly to the valve shaft of the valve 100 by the actuator shaft 16.

The declutch lever 72 is typically in the disengaged position until manual operation of the valve is desired. To engage manual operation, the declutch lever may simply be moved into the engaged position which causes the axle 22 to move toward the drive gear 18. This in turn causes the threads of the worm gear 20 to engage the teeth of the drive gear 18. Once engaged, rotation of handwheel 24 causes the axle 22 and worm gear 20 to rotate. Rotation of the worm gear 20 in turn cases rotation of drive gear 18 and consequently actuator shaft 16. In this manner, rotational movement of the handwheel 24 is translated into rotational movement of actuator shaft 16.

To disengage the manual override mechanism 10, the actuator shaft 16 must be moved into the default position (generally by operation of handwheel 24). If the automated actuator is not in the default (i.e. spring relaxed) position, the safety mechanism prevents the declutch lever 72 from being moved into the disengaged position. Once the actuator shaft 16 is moved into the default position, the keyway 94 aligns with the plunger 90 to allow the plunger 90 to be axially shifted into the keyway 94. This moves the plunger 90 out from above the locking bar 78. While holding the plunger 90 in the shifted position, the locking bar 78 can be lifted toward cross member 74 to allow the declutch lever 72 to move into the disengaged position.

The above description is that of a preferred embodiment of the invention. Various alterations and changes can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows.

1. A manual override valve actuator with an improved declutch mechanism, the actuator comprising:

a housing defining first and second mounting planes;

a drive gear mounted for rotational movement within said housing;

a pair of bushings rotatably seated within said housing;

an axle eccentrically seated within said bushings;

a worm gear mounted on said axle;

a declutch lever secured to both of said bushings, said declutch lever movable between a first position in which said worm gear is engaged with said drive gear and a second position in which said worm gear is disengaged from said drive gear, said declutch lever located between said mounting planes during its entire range of motion; and a locking means for selectively locking said declutch lever in an engaged position, said locking means mounted to said declutch lever and moveable between a first position in which said locking means is engaged with said housing to prevent movement of said declutch lever and a second position in which said locking means is disengaged from said housing.

2. The declutch mechanism of claim 1, further comprising a bias means for biasing said locking means in said first position.

3. The declutch mechanism of claim 2, wherein said declutch lever is generally U-shaped and includes first and second ends, said first end of said lever affixed to one of said pair of bushings and said second end of said lever affixed to the other of said pair of bushings.

4. The declutch mechanism of claim 3, wherein said locking means comprises a locking bar slidably mounted to said declutch lever.

5. The declutch mechanism of claim 4, wherein said bias means includes a spring slidably fit over said declutch lever and engaging said locking bar.

6. The declutch mechanism of claim 5, wherein said locking bar is movable between a first position in which said locking bar engages said housing to prevent movement of said declutch lever, and a second position in which said locking bar is disengaged from said housing to allow movement of said declutch lever.

7. The declutch mechanism of claim 6, further comprising:

an actuator shaft having a default position rotatably mounted within said housing; and a safety means for preventing said worm gear from disengaging said drive gear when said shaft is not in said default position.

8. The declutch mechanism of claim 7, wherein said shaft includes a keyway; and wherein said safety means includes a plunger extending through said housing.

9. The declutch mechanism of claim 8, wherein said plunger is movable between a first position in which said plunger prevents said locking bar from being moved into said second position, and a second position in which said plunger engages said keyway to allow movement of said locking bar.

10. The declutch mechanism of claim 9, wherein said plunger is spring-biased toward the first position.

11. A manual valve actuator override mechanism, comprising:

a housing;

an actuator shaft having a default position and being rotatably mounted in said housing to operationally engage a valve shaft of a valve;

a manual drive means for manually rotating said actuator shaft, said manual drive means mounted to said housing;

a declutch means for selectively engaging and disengaging said manual drive means from said actuator shaft, said declutch means mounted to said housing; and a safety means for preventing said manual drive means from being disengaged from said actuator shaft when said actuator shaft is not in said default position, said safety means mounted to said housing.

12. The override mechanism of claim 11, wherein said declutch means includes a declutch lever, said declutch lever movable between a first position in which said manual drive means is engaged with said actuator and a second position in which said manual drive means is disengaged from said actuator.

13. The override mechanism of claim 12, wherein said safety means includes a plunger means for preventing said declutch lever from being moved into said second position when said actuator shaft is not in said default position.

14. The override mechanism of claim 13, wherein said plunger means includes a plunger that is movable between a first position in which said plunger prevents said declutch lever from being moved into said second position, and a second position in which said plunger allows movement of said declutch lever into said first position.

15. A manual valve actuator override mechanism, comprising:

a housing;

an actuator shaft having a default position and being rotatably mounted in said housing;

a manual drive means for manually rotating said actuator shaft, said manual drive means mounted to said housing;

a declutch means for selectively engaging and disengaging said manual drive means from said actuator shaft, said declutch means mounted to said housing, said declutch means including a declutch lever, said declutch lever movable between a first position in which said manual drive means is engaged with said actuator and a second position in which said manual drive means is disengaged from the actuator; and a safety means for preventing said manual drive means from being disengaged from said actuator shaft when said actuator shaft is not in said default position, said safety means mounted to said housing, said safety means including a plunger means for preventing said declutch lever from being moved into said second position when said actuator shaft is not in said default position, said plunger means including a plunger that is movable between a first position in which said plunger prevents said declutch lever from being moved into said second position, and a second position in which said plunger allows movement of said declutch lever into said first position, wherein said actuator shaft includes a keyway for receiving said plunger when said plunger is moved into said second position.

16. The override mechanism of claim 15, wherein said plunger is spring biased toward said first position.

17. The override mechanism of claim 16, wherein said declutch lever includes a locking means for selectively locking said declutch lever in an engaged position, said locking means mounted to said declutch lever and moveable between a first position in which said locking means is engaged with said housing to prevent movement of said declutch lever and a second position in which said locking means is disengaged from said housing.

18. The override mechanism of claim 17, wherein said locking means comprises a locking bar slidably mounted to said declutch lever.

19. The override mechanism of claim 18, wherein said bias means includes a spring slidably fit over said declutch lever and engaging said locking bar.

20. The override mechanism of claim 19, wherein said housing defines a pair of mounting planes; and wherein said declutch lever is generally U-shaped and is located between said mounting planes during its entire range of motion.

21. An improved declutch mechanism comprising an actuator shaft for operationally engaging a valve shaft of a valve, said actuator shaft having a default position; a manual drive shaft for manually rotating said actuator shaft; and a declutch system for selectively engaging and disengaging said drive shaft with said actuator shaft; wherein the improvement comprises said declutch system comprising:

safety means for preventing operation of said declutch system to disengage said manual shaft from said actuator shaft when said actuator shaft is in a position other than the default position.

22. The declutch mechanism of claim 21, wherein said declutch system further includes a declutch lever movable between a first position in which said manual drive shaft is engaged with said actuator shaft and a second position in which said manual drive shaft is disengaged from said actuator shaft.

23. The declutch mechanism of claim 22, wherein said safety means includes a plunger that is movable between a first position in which said plunger prevents said declutch lever from being moved into said second position, and a second position in which said plunger allows movement of said declutch lever into said first position.

24. An improved declutch mechanism comprising an actuator shaft having a default position, a manual drive shaft, and a declutch system for selectively engaging and disengaging said drive shaft with said actuator shaft, wherein the improvement comprises said declutch system comprising:

said declutch system including a declutch lever movable between a first position in which said manual drive shaft is engaged with said actuator shaft and a second position in which said manual drive shaft is disengaged from said actuator shaft; and safety means for preventing operation of said declutch system to disengage said manual shaft from said actuator shaft when said actuator shaft is in a position other than the default position, said safety means includes a plunger that is movable between a first position in which said plunger prevents said declutch lever from being moved into said second position, and a second position in which said plunger allows movement of said declutch lever into said first position, wherein said actuator shaft includes a keyway for receiving said plunger when said plunger is moved into said second position, said keyway being positioned to align with said plunger when said actuator shaft is in said default position.

25. The declutch mechanism of claim 24, wherein said plunger is spring biased toward said first position.

26. The declutch mechanism of claim 25, wherein said actuator shaft, said declutch system and said safety means are mounted to a common housing; and wherein said declutch lever includes a locking bar slidably mounted to said declutch lever, said locking bar moveable between a first position in which said locking bar is engaged with said housing to prevent movement of said declutch lever and a second position in which said locking means is disengaged from said housing.

27. The declutch mechanism of claim 26, wherein said locking bar is biased toward said first position.

28. The declutch mechanism of claim 27, wherein said housing defines a pair of mounting planes; and wherein said declutch lever is generally U-shaped and is located between said mounting planes during its entire range of motion.

* * * * *